July 10, 1956 F. H. PARKER 2,753,891
MIXING VALVE
Filed July 12, 1952 3 Sheets-Sheet 1
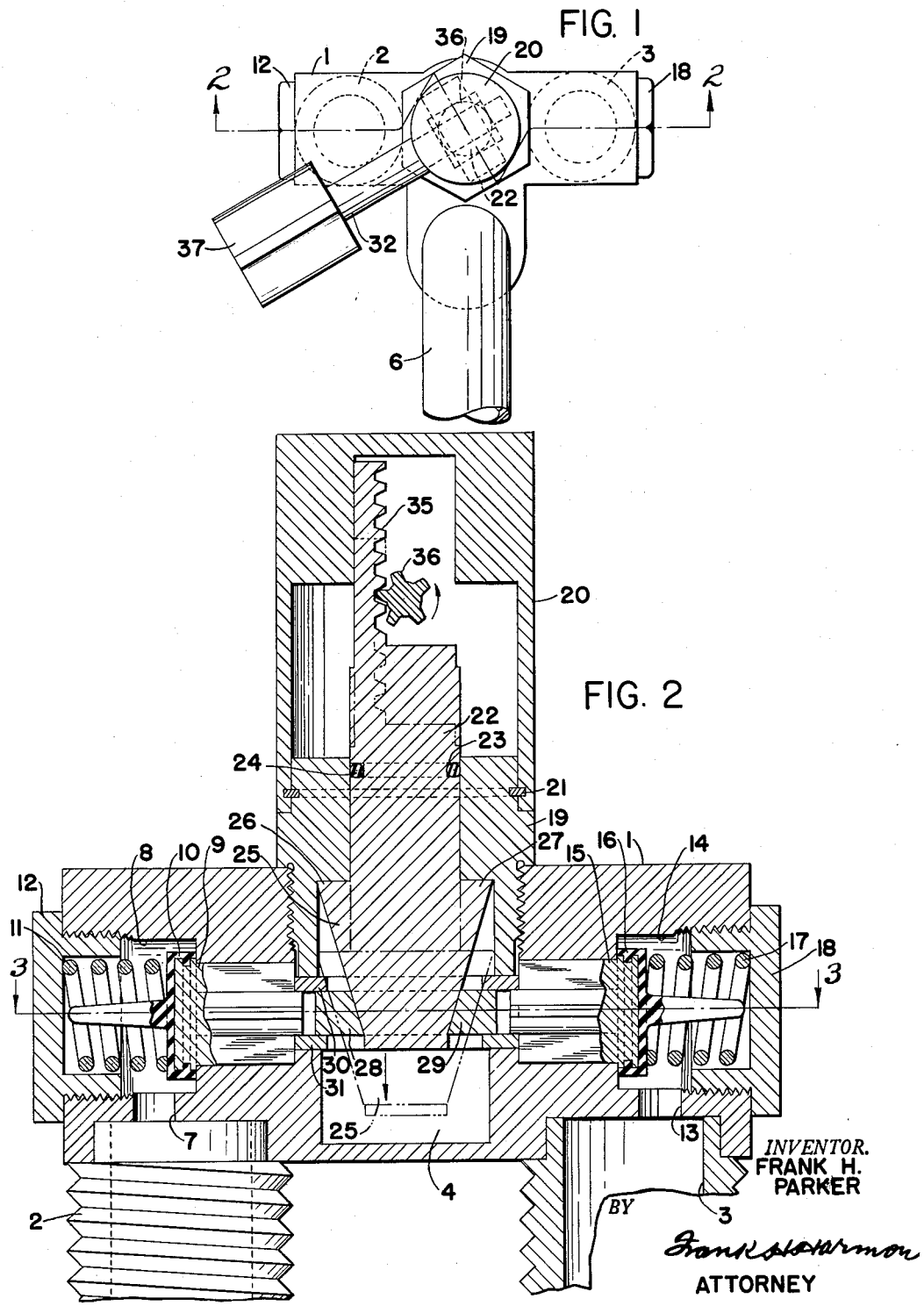
INVENTOR.
FRANK H. PARKER
BY
Frank H. Parker
ATTORNEY July 10, 1956    F. H. PARKER    2,753,891
MIXING VALVE
Filed July 12, 1952    3 Sheets-Sheet 2
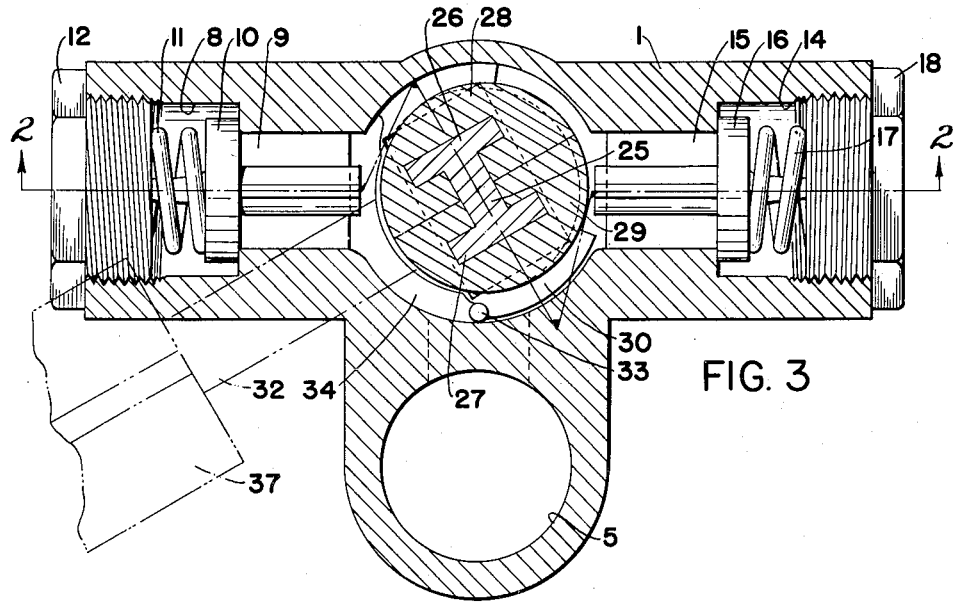
FIG. 3
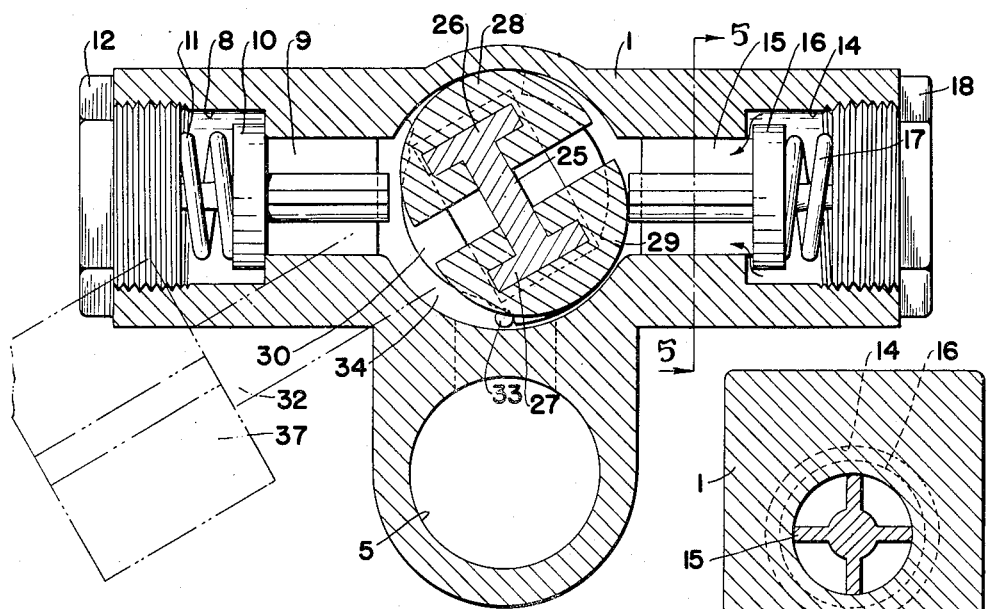
FIG. 4
FIG. 5
INVENTOR.
FRANK H. PARKER
BY
Frank H. Harmon
ATTORNEY July 10, 1956
F. H. PARKER
2,753,891
MIXING VALVE
Filed July 12, 1952
3 Sheets-Sheet 3
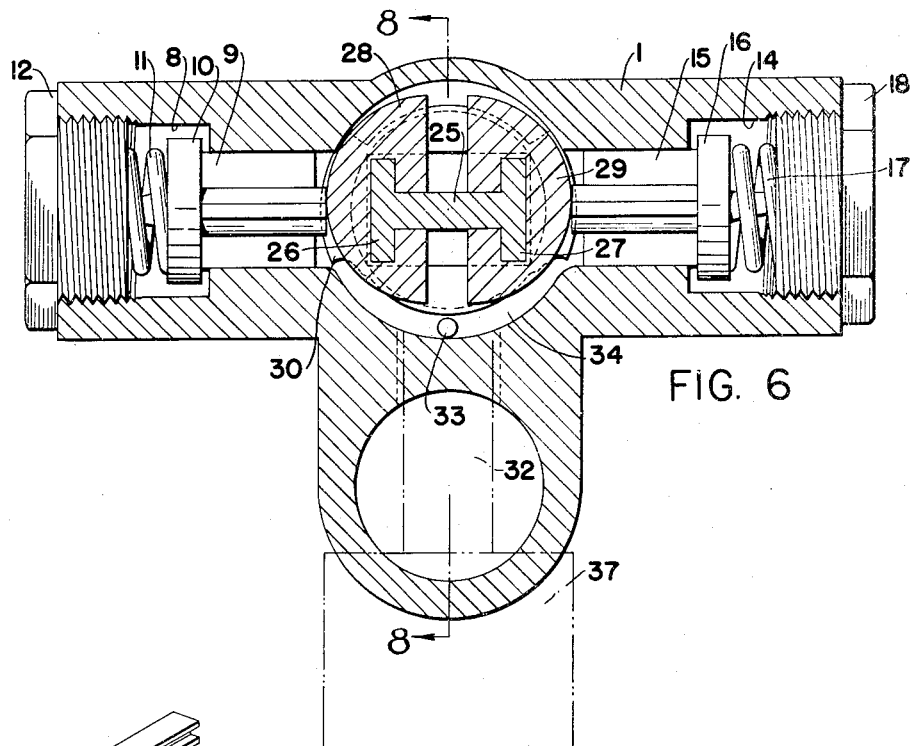
FIG. 6
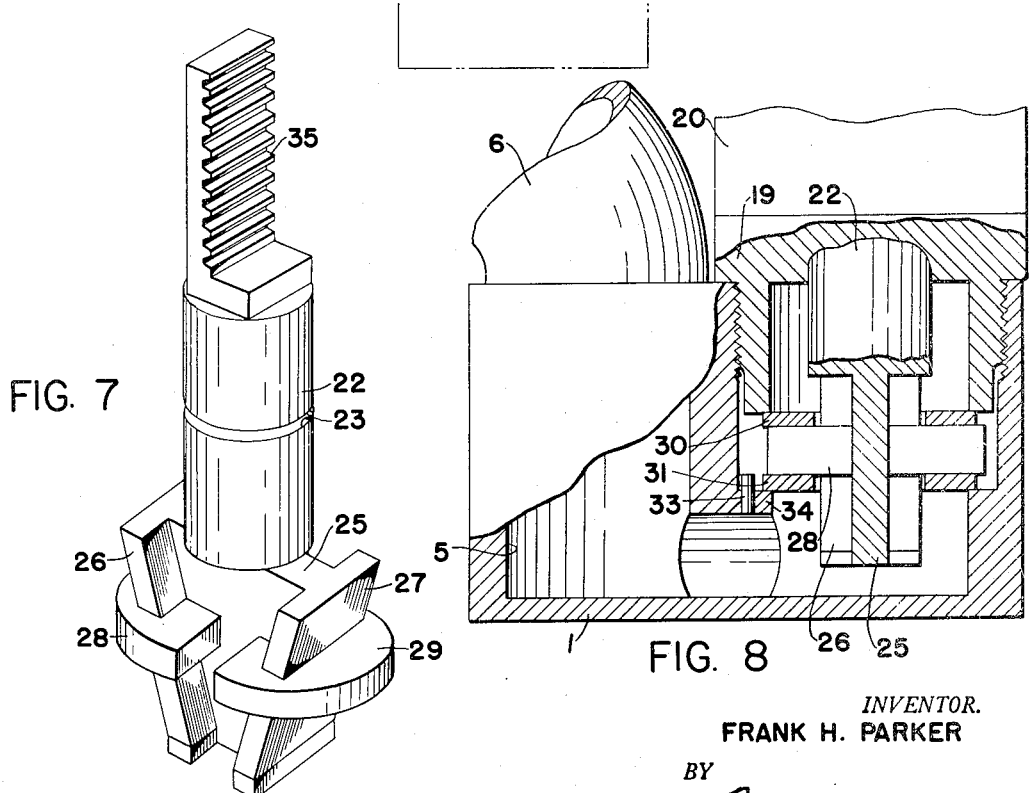
FIG. 7
FIG. 8
INVENTOR.
FRANK H. PARKER
BY
Frank H. Hoffman
ATTORNEY United States Patent Office 2,753,891
Patented July 10, 1956

2,753,891

MIXING VALVE

Frank H. Parker, Cleveland Heights, Ohio, assignor, by direct and mesne assignments, to Stephen C. Peplin, Westlake, Ohio, trustee Application July 12, 1952, Serial No. 298,551

4 Claims. (Cl. 137—635)

This invention relates in general to mixing valves and more particularly to improvements in mixing valves for fluids, whether gaseous or liquid, of like or different nature and of even or different temperatures.

One of the primary objects of the invention is to provide a pressure fluid control unit having a discharge outlet, with manual control means whereby, with a simple manipulation with the same one hand, the operator may effect valve control of the proportion of flow of two fluids, even to the exclusion of each other, or both, and also control the over-all pressure volume of flow through the discharge outlet.

Another object is to provide such a unit with means whereby the temperature of the discharged fluid may be varied without volume change and vice versa.

Another object is to so combine such a single combined manual valve control means that will be convenient for operation by one hand, and at the same time be independently manipulated in two planes for fluid mixture and volume control.

A further object is to provide a single valve operating split cam which is manually turnable by a rod about one axis by one manual control operation for shuttle valve control of fluid mixture and in which the cam operating rod is manually linearly moved to expand or contract the split cam for independent manual shuttle valve control for fluid flow volume control.

A still further object is to provide an improved shuttle valve control for fluid mixture control operable independently of shuttle valve control for fluid volume control, for admitting desired quantities of fluid into the mixing chamber, which control includes a single two piece shuttle valve control cam rotatable about its one axis and provided with rod means for spreading the cam variably in accordance with linear movements of the rod for fluid volume discharge control, without the necessity for another valve in addition to two opposed shuttle valves.

With the foregoing and other objects in view, the invention resides in the combination of parts and in the details of construction hereinafter set forth in the following specification and appended claims, certain embodiments thereof being illustrated in the accompanying drawings, in which:

Figure 1 is a top plan view of the single control handle for two independent valve controls;

Figure 2 is a view in vertical section taken through the faucet, taken along line 2—2 of Figures 1 and 3, showing the shuttle valve cam operating rod in full lines in elevated position for closing both shuttle valves for no volume and in dotted lines for full volume;

Figure 3 is a view in section taken along line 3—3 of Figure 2;

Figure 4 is a view similar to Figure 3 showing the handle with the gear rotated to lower the cam and rod to the chain dotted line of Figure 2;

Figure 5 is a view in section taken along line 5—5 of Figure 4 through one of the shuttle valves;

Figure 6 is a view similar to Figure 4, showing the handle moved to sixty degrees to open both shuttle valves to an equal amount;

Figure 7 is a view in perspective of the shuttle valve operating cam and cam operating rod; and Figure 8 is a view in section taken along line 8—8 of Figure 6.

Referring more particularly to the drawings, I have shown my faucet as comprising a main body 1 with two fluid inlet pipes 2 and 3 supported thereby, a mixing chamber 4 in the body, an outlet chamber 5 and a discharge spout 6. Communicating with fluid inlet pipe 2 is a passage 7 leading to a chamber 8 in back of a shuttle valve 9 provided with a seal 10 and normally urged by a spring 11, bearing against a closure screw plug 12, to normally close the shuttle valve 10 against its seat. Similarly, I provide for fluid inlet pipe 3 passage 13 extending into a chamber 14 behind a shuttle valve 15, provided with a seal 16, the shuttle valve being normally urged to the left against a seat in closed position by a spring 17 bearing on the shuttle valve 15 and a screw plug closure cap 18.

As hereinbefore stated, my invention relates to improvements in mixing valve construction for fluids, whether gaseous or liquid, of like or unlike nature, and of even or uneven temperatures. However, for purposes of illustration, I will refer to my device as comprising a faucet and my valve and valve operating means as a hot and cold water mixing valve assembly.

In my shuttle valve construction the purpose of the two compression coil springs 11 and 17 is merely to normally urge the two shuttle valves 9 and 15 in opposite directions into closed position to close off fluid flow from both the two inlet pipes 2 and 3 to the mixing chamber 4 and to the discharge outlet 5 and nozzle 6. When either or both shuttle valves are opened, a normal pressure in the main line will suffice for closing both shuttle valves without assistance from the spring.

In order to obtain shuttle valve control for mixing end volume control, I employ a cam and a cam operating means, as shown in perspective in Figure 7. In order to house this assembly, I provide a housing 19 that is screw threaded into the main body 1 in a plane at right angles to the main body. To this housing, I releasably secure another housing 20 and between the housings 19 and 20, I provide a lock ring 21. In housing 19 I slidably mount a rod 22, having a circumferential recess 23 to accommodate an O ring 24 for sealing purposes. As shown in Figure 2, this rod 22 is mounted for vertical linear movement as well as for rotative movement about its own vertical axis. Rigidly secured to the bottom of rod 22 is a bar 25 that is integral with two angularly vertically converging legs 26 and 27 that slidably fit in angularly converging slots in two semi-circular plates 28 and 29, respectively. These two semi-circular plates 28 and 29 form the two parts of a single cam disc and are maintained against vertical movement by means of an upper bushing 30 and a lower bushing 31 in the main body 1.

For rotation of the shuttle valve operating cam, comprising the two split cam sections 28 and 29, I provide a handle 32 so that a swinging movement of the handle rotates the rod 22, and consequently the cam 28, 29 about a vertical axis.

In full lines in Figure 2, and also in Figure 3, the handle has been moved to a position in which the two cam sections 28 and 29 are completely out of contact with both shuttle valves, in which case the two springs, or the pressure in the two inlet lines, maintain the valves closed, so that no fluid from either inlet pipe 2 or 3 may flow into the mixing chamber 4. I have stated before, the split cam 28, 29 is positioned against vertical movement by an upper bushing 30 and lower bushing 31 in snug relationship. Therefore, as the rod 22 is rotated, the upper and lower bushing 30 and 31 rotate with the cam. In order to form a limit stop for the rotation of the cam and bushing assembly I may provide a limit stop pin 33 in the shoulder 34 of the main body 1, as more clearly shown in Figure 8, for contacting the lower bushing. The lower bushing 31 is shown out of contact with the limit stop pin 33 in Figure 8, but is shown engaged by the cam in Figure 4.

Having thus briefly described the rotative action of the cam, for purposes of fluid mixture control, I will now refer to the vertical actuation of the rod 22 and its converging legs 26 and 27 for operating the cam 28, 29 for fluid volume control. This includes a rack 35 formed on the upper portion of the rod 22 so as to be engaged at all times by a pinion 36 connected to a rotatable handle 32 and connected to a hand knob 37. As stated before, swinging of the handle 32, about the rod 22 as a vertical axis, rotates the cam for fluid mixture valve control. Rotation of the hand knob 37 about the handle 32 as an axis, rotates the pinion 36 to move the rack 35 vertically up or down in accordance with the direction of rotation of the hand knob 37. In Figure 2, in full lines, the rod 22 and the two angularly disposed arms 26 and 27 are in their uppermost positions so that the two split cam portions 28 and 29 are closed to a minimum overall diameter so as to be out of contact with the stems of the two shuttle valves so that both shuttle valves 9 and 15 remain closed, as shown in Figure 3.

Rotation of the hand knob 37 to rotate the pinion 36 in a counterclockwise direction, as shown in Figure 2, forces the rod 22, and consequently its two lower angularly disposed arms 26 and 27 downwardly to assume the position as shown in dotted lines in Figure 2 to spread the two piece split cam radially outwardly, as shown in Figures 4 and 6. In Figure 6 the single combined manual control has been operated to bring about an equal opening of the two shuttle valves for equal mixture contact and for maximum volume of flow. In Figure 4 the manual control has been operated to spread the split cam radially outwardly for maximum volume of flow of one shuttle valve, while the other shuttle valve remains out of contact with the split cam so as to remain closed.

Thus, it will be seen that I have provided a faucet, or other pressure fluid control unit, with a mixing valve assembly for controlling the discharge of fluid, whether gaseous or liquid of like or different nature and of even or different temperatures. I have also provided a mixing valve assembly with a single manual control means whereby with a simple manipulation with the same one hand, the operator may effect valve control of the proportion of flow of the two fluids, even to the exclusion of each other, or of both, and also control the overall volume of flow through the discharge outlet. I have also provided in such a unit means whereby the temperature of the discharged fluid may be varied without volume change, or vice versa. I have also provided a single combined manual valve control means that is convenient for operation by one hand and independently manipulated in two different planes for fluid mixture and fluid volume control. I have also provided such a pressure fluid control unit in which all parts, including a single operating stem and a single valve operating two piece cam for volume and mixture control, may be installed, removed and replaced with the maximum of ease. I have also provided a single valve operating split cam which is manualy turnable by a rod about one axis by one manual control operation for shuttle valve control of fluid mixture and in which the stem is manually linearly moved to expand or contract the split cam for independent manual shuttle valve control for fluid volume control. I have also provided an improved shuttle valve control for fluid mixture control operable independently of shuttle valve control for fluid volume control for admitting desired quantities of fluid into the mixing chamber, which control includes a single two piece shuttle valve control cam rotatable about its one axis and provided with rod means for spreading the cam variably in accordance with linear movements of the rod for fluid volume discharge control, without the necessity for another valve in addition to the two opposed shuttle valves.

I claim:

1. In a fluid mixing and fluid volume control unit having a housing and a pair of inlets for pressure fluid leading into a fluid mixing chamber and a fluid discharge outlet therefrom and a pair of opposed shuttle valves, each with an inwardly extending stem, and each normally closing fluid flow from its inlet into the mixing chamber in response to fluid pressure from said inlets, a two-piece cam and a manually operable rod connected to said cam for rotating the latter to selectively engage the stems of said shuttle valves to selectively operate said shuttle valves to control the proportion of mixture of flow from said inlets into said mixing chamber, said manually operable rod including a pair of downwardly converging members to engage said two-piece cam, said rod being movable vertically to positively radially spread and contract said two-piece cam in a plane coaxial with the plane of disposition of said shuttle valves in said inlet so as to engage the stems of said shuttle valves, in any rotative adjusted position of the cam for controlling the quantity of the mixture independently of the proportion for the purpose of adjusting and controlling the combined volume of flow of the proportionally adjusted mixture of fluids from the inlets.

2. In a fluid mixing and fluid volume control unit having a housing and a pair of inlets for pressure fluid leading into a fluid mixing chamber and a fluid discharge outlet therefrom and a pair of opposed shuttle valves, each with an inwardly extending stem, and each normally closing fluid flow from its inlet into the mixing chamber in response to fluid pressure from said inlets, a two-piece cam and manually operable rod connected to said cam for rotating the latter to selectively engage the stems of said shuttle valves to selectively operate said shuttle valves to control the proportion of mixture of flow from said inlets into said mixing chamber, said manually operable rod including a pair of downwardly converging legs each of which engages a slot in a member of said two-piece cam, said rod being movable vertically to positively radially spread and contract said two-piece cam in a plane coaxial with the plane of disposition of said shuttle valves in said inlet so as to engage the stems of said shuttle valves, in any rotative adjusted position of the cam for controlling the quantity of the mixture independently of the proportion for the purpose of adjusting and controlling the combined volume of flow of the proportionally adjusted mixture of fluids from the inlets and means carried by the housing both above and below said cam for limiting the vertical movement of said rod.

3. In a fluid mixing and fluid volume control unit having a housing and a pair of inlets for pressure fluid leading into a fluid mixing chamber and a fluid discharge outlet therefrom and a pair of opposed shuttle valves, each with an inwardly extending stem, and each normally closing fluid flow from its inlet into the mixing chamber in response to fluid pressure from said inlets, a two-piece cam and a manually operable rod connected to said cam for rotating the latter to selectively engage the stems of said shuttle valves to selectively operate said shuttle valves to control the proportion of mixture of flow from said inlets into said mixing chamber, said manually operable rod including a pair of downwardly converging legs each of which engages a slot in a member of said two-piece cam, said rod being movable vertically to positively radially spread and contract said two-piece cam in a plane coaxial with the plane of disposition of said shuttle valves in said inlet so as to engage the stems of said shuttle valves, in any rotative adjusted position of the cam for controlling the quantity of the mixture independently of the proportion, for the purpose of adjusting and controlling the combined volume of flow of the proportionally adjusted mixture of fluids from the inlets, limit stop means carried by the housing both above and below said cam for limiting the vertical movement of said rod.

4. In a fluid mixing and fluid volume control unit having a housing and a pair of inlets for pressure fluid leading into a fluid mixing chamber and a fluid discharge outlet therefrom and a pair of opposed shuttle valves, each with an inwardly extending stem, and each normally closing fluid flow from its inlet into the mixing chamber in response to fluid pressure from said inlets, a two-piece cam and manually operable rod connected to said cam for rotating the latter to selectively engage the stems of said shuttle valves to selectively operate said shuttle valves to control the proportion of mixture of flow from said inlets into said mixing chamber, said manually operable rod including a pair of downwardly converging members to engage said two-piece cam, said rod being movable vertically to positively radially spread and contract said two-piece cam in a plane coaxial with the plane of disposition of said shuttle valves in said inlet so as to engage the stems of said shuttle valves, in any rotative adjusted position of the cam for controlling the quantity of the mixture independently of the proportion, for the purpose of adjusting and controlling the combined volume of flow of the proportionally adjusted mixture of fluids from the inlets, limit stop means carried by the housing for engagement by said cam for limiting the extent of rotation thereof and means carried by the housing both above and below said cam for limiting vertical movement of said rod.

References Cited in the file of this patent

UNITED STATES PATENTS

| 149,330 | Murdock | Apr. 7, 1874 |
| 431,082 | Sulzman | July 1, 1890 |
| 2,301,439 | Moen | Nov. 10, 1942 |

FOREIGN PATENTS

| 476,756 | Germany | of 1929 |